United States Patent [19]

Takamatsu

[11] 4,019,776

[45] Apr. 26, 1977

[54] REPLACEABLE SEAT COVER

[75] Inventor: Ikuo Takamatsu, Uozu, Japan

[73] Assignee: Yoshida Kogyo Kabushiki Kaisha, Tokyo, Japan

[22] Filed: Jan. 22, 1976

[21] Appl. No.: 651,403

[30] Foreign Application Priority Data

Feb. 3, 1975  Japan ............... 50-15765[U]

[52] U.S. Cl. .................... 297/219; 297/218; 297/223
[51] Int. Cl.² ..................................... A47C 27/00
[58] Field of Search .......... 297/218, 219, 223, 283

[56] References Cited

UNITED STATES PATENTS

| | | | |
|---|---|---|---|
| 1,853,579 | 4/1932 | Sallop | 297/223 |
| 2,233,986 | 3/1941 | Leech | 297/218 |
| 2,627,303 | 2/1953 | Bard | 297/223 |

*Primary Examiner*—James C. Mitchell
*Attorney, Agent, or Firm*—Dennison, Dennison, Meserole & Pollack

[57] ABSTRACT

A replaceable front cover is attached to an upholstered seat, as of a passenger car, by means of a slide fastener. The fastener comprises a pair of completely separable stringers, one of which is secured to the front cover and the other to the seat.

4 Claims, 3 Drawing Figures

REPLACEABLE SEAT COVER

BACKGROUND OF THE INVENTION

1. Field of the Invention

This invention relates to seats and in particular to upholstered seats such as those used in passenger cars and other vehicles or in homes. Even more particularly, the invention is directed to readily replaceable covers for such seats.

2. Prior Art

Some upholstered seats or chairs of the aforementioned kinds are equipped with replaceable front covers designed to afford added sitting comfort. The front covers may be made, for example, of woven or knitted fabrics highly permeable to air, or of furs or napped artificial material, and may be used interchangeably according to the seasons of the year.

For removable attachment of such front covers to desired seats, there have been customarily employed rubber strings, hooks and similar fastening means which are secured to spaced apart points on the periphery of each cover for engagement with suitable means arranged on the rear of the seat. These conventional fastening means make the replacement of the front covers highly troublesome and time-consuming because they must be engaged and disengaged individually.

Moreover, since the front cover is attached only at its spaced peripheral points to the seat by the conventional fastening means, the peripheral edges of the cover are easy to be turned over or twisted at other than its points fastened to the seat, with the consequent impairment of sitting comfort. Such defect is even more pronounced in the case of the front cover attached to the seat by means of rubber stringers since, as a person sits on the seat, the entire cover inevitably slides over the seat owing to the elasticity of the rubber strings.

SUMMARY OF THE INVENTION

It is an object of this invention to provide a combination of a seat, a cover for the seat, and means for attaching the cover to the seat in a readily replaceable manner, such that the listed disadvantages of the prior art are thoroughly overcome.

Briefly, the invention contemplates the use of a slide fastener for removably attaching a cover to a desired part of a seat. The slide fastener is of the type comprising a pair of completely separable fastener stringers, one of which is attached to the seat so as to extend along the boundary of the desired part thereof, and the other of which is attached to the cover along its periphery.

Thus, according to this invention, the cover can be readily attached to and removed from the seat merely by closing and opening the slide fastener through the function of the slider movable along the interlocking rows of fastener elements or scoops. The use of the slide fastener for the application noted above is doubly advantageous because (1) it expedites the replacement of the covers and (2) it attaches the cover to the seat more firmly than the prior art means. Since the slide fastener secures the complete periphery of the cover to the seat, the cover is prevented from being displaced, or from having its peripheral edges turned over or twisted, in any possible working conditions.

The above and other objects, features and advantages of this invention will become apparent in the course of the following description taken together with the accompanying drawings which illustrate a preferred embodiment of the invention, and in which like reference characters refer to like parts throughout.

DESCRIPTION OF THE PREFERRED EMBODIMENT

Figure 1:
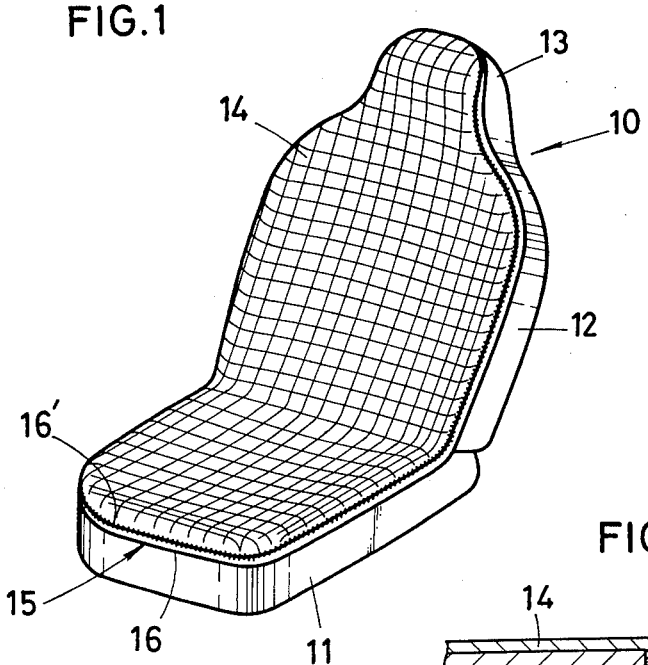
FIG. 1 is a perspective view of a passenger car front seat to which there is attached a replaceable front cover in accordance with the principles of this invention.

The accompanying drawings illustrate the present invention as adapted specifically for an upholstered front seat of a passenger car. In FIG. 1 the seat is generally designated by the reference numeral 10 and is shown to comprise a seat proper 11 and a back-rest 12 suitably connected together, with the back-rest 12 being integrally provided with a headrest 13 projecting upwardly therefrom.

The seat 10 has a removable front cover 14 which covers the entire front surfaces of the seat proper 11 and back-rest 12, inclusive of the headrest 13, and which is formed exactly to the shape of the front surfaces of the seat. For removably attaching the front cover 14 to the seat 10, this invention employs a slide fastener 15 of the type having a pair of completely separable fastener stringers 16, 16'.

Figure 2:
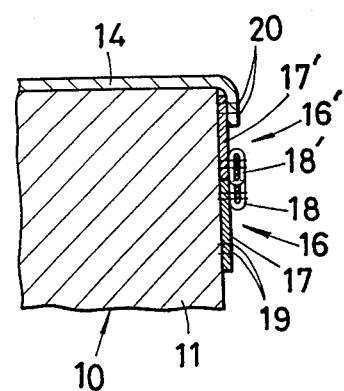
FIG. 2 is an enlarged partial cross-sectional view of the seat of FIG. 1, the view showing means for attaching the front cover to the seat.

As illustrated on a greatly enlarged scale in FIG. 2, the separable fastener stringers 16, 16' include tapes 17, 17' carrying interlocking rows of fastener elements or scoops 18, 18' along their opposed longitudinal edges, respectively. The fastener stringer 16 has its tape 17 stitched at 19 to the seat 10 so as to extend all along the boundary of its front surfaces. The other fastener stringer 16' has its tape 17' stitched at 20 to the front cover 14 and extends all along its periphery.

Figure 3:
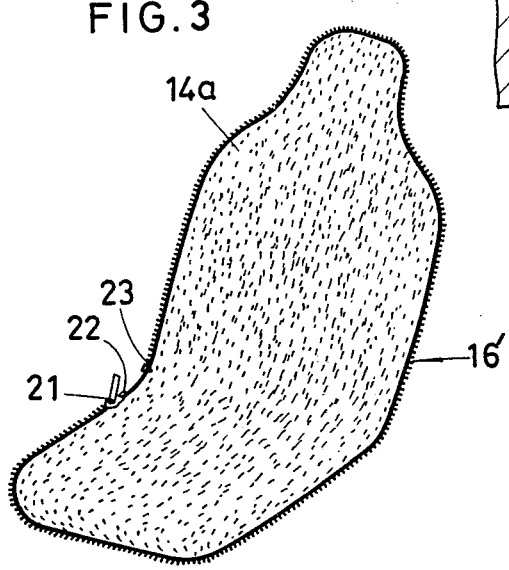
FIG. 3 is a perspective view of another type of front cover which is interchangeable with that shown in FIG. 1.

With reference to FIG. 3, the slide fastener 15 further comprises a slider 21 movable along the rows of fastener elements 18, 18' for progressively engaging and disengaging same, a separable bottom end connection 22 (shown partly) such as the well known box and pin separable coupling for limiting the movement of the slider at one end of the fastener, and a pair of top stops 23 (one shown) for limiting the slider movement at the other end of the fastener.

The front cover 14 shown in FIG. 1 is made of a woven or knitted fabric with high permeability to air for use in the hot season, whereas the front cover 14a shown in FIG. 3 is made of a fur or napped fabric for use in the cold season.

For attachment of either of these front covers 14 and 14a to the seat 10, the fastener stringer 16' of the desired front cover is connected with the companion stringer 16 of the seat at the aforesaid one end of the fastener by means of the separable bottom end connection 22. Then, with the front cover placed in position over the seat 10, the slider 21 is pulled along the rows of fastener elements 18, 18' in the fastener closing direction, up to the pair of top stops 23. The front cover is readily removable by pulling the slider 21 down to the separable bottom end connection 22 and then by separating same.

While this invention has been described in terms of its preferred embodiment illustrated in the accompanying drawings, it is not desired to limit the invention to the exact details of construction disclosed. For example, instead of covering the entire front surfaces of the seat by a single cover as in the illustrated embodiment, separate covers may be attached to the seat proper and the back-rest of the seat by means of separate slide fasteners.

Although other modifications or changes may be suggested by those versed in the art, it should be understood that I wish to embody within the scope of the patent warranted hereon, all such embodiments as reasonably and properly come within the scope of my contribution to the art.

What is claimed is:

1. A seat construction comprising:
   a. a seat base having a generally horizontal seat portion and a generally vertical back portion, said seat and back portions meeting along a linear line to provide a continuous front surface and a continuous peripheral surface on said seat base;
   b. a seat cover covering the entire front surface of said seat base, said seat cover being substantially complementary in shape to the front surface of said seat base and having a periphery coextensive with the peripheral surface on the seat base; and
   c. a sliding clasp fastener directly detachably attaching said seat cover to said seat base substantially completely thereabout, said sliding clasp fastener including a pair of stringer tapes carrying along their longitudinal edges rows of interengageable fastener elements, a slider movable along the rows of fastener elements to close and open said sliding clasp fastener, and a pair of end stops secured to opposite ends of said sliding clasp fastener, one of said stringer tapes being secured to and extending along substantially the complete periphery of said seat cover, and the other of said stringer tapes being secured to and extending along substantially the complete peripheral surface of said seat base, whereby the detachable attaching of the seat cover to the seat base is effected completely thereabout.

2. The construction of claim 1, wherein said front surface and said peripheral surface are angularly related and define a front surface edge therebetween, said other of said stringer tapes being secured to the peripheral surface in spaced relation to said front surface edge, said one stringer tape overlying said peripheral surface beyond the front surface edge.

3. The construction of claim 2, wherein said end stops are disposed on opposite sides of said linear meeting line in closely adjacent relation thereto.

4. The construction of claim 1, wherein said end stops are disposed on opposite sides of said linear meeting line in closely adjacent relation thereto.

* * * * *